United States Patent [19]

Nishino et al.

[11] Patent Number: 5,786,679
[45] Date of Patent: Jul. 28, 1998

[54] DC MOTOR DRIVEN POWER STEERING SYSTEM FOR A MOTOR VEHICLE

[75] Inventors: Kazuhisa Nishino; Hirohisa Awa; Shunichi Wada, all of Himeji, Japan

[73] Assignee: Mitsubishi Denki Kabushiki Kaisha, Tokyo, Japan

[21] Appl. No.: 407,281

[22] Filed: Mar. 20, 1995

[30] Foreign Application Priority Data

Mar. 22, 1994 [JP] Japan ............... 6-050682

[51] Int. Cl.$^6$ ............................ H02K 23/00
[52] U.S. Cl. ............ 318/696; 318/254; 318/439; 318/811; 388/806; 388/847; 388/928.1
[58] Field of Search ................ 318/254, 439, 318/138, 685, 696, 810, 811, 488, 474–477, 287, 288, 296–298; 388/804, 806, 847, 928.1; 180/443–446

[56] References Cited

U.S. PATENT DOCUMENTS

| | | | |
|---|---|---|---|
| 4,751,438 | 6/1988 | Markunas | 318/254 |
| 5,081,404 | 1/1992 | Kelley et al. | 318/434 |
| 5,150,021 | 9/1992 | Kamono et al. | 318/488 |
| 5,202,830 | 4/1993 | Tsurumiya et al. | 364/424.05 |
| 5,341,453 | 8/1994 | Hill | 388/928.1 X |
| 5,378,975 | 1/1995 | Schweid et al. | 318/685 |
| 5,460,235 | 10/1995 | Shimizu | 318/434 X |

FOREIGN PATENT DOCUMENTS

| | | |
|---|---|---|
| 4-8190 | 1/1992 | Japan. |
| 48190 | 1/1992 | Japan. |

*Primary Examiner*—Brian Sircus
*Attorney, Agent, or Firm*—Sughrue, Mion, Zinn, Macpeak & Seas, PLLC

[57] ABSTRACT

A DC motor driven power steering system for a motor vehicle includes a motor current detection circuit for detecting a motor current flowing through the DC motor, a power supply voltage detection circuit for detecting a power supply voltage applied to the bridge commutation circuit, a motor voltage estimating unit for estimating a voltage applied across the DC motor on the basis of the power supply voltage applied to the bridge commutation circuit and the pulse-width modulated control signals used for controlling the bridge commutation circuit, and a motor rotation detecting means for detecting the rotation state of the DC motor on the basis of the motor current and the estimated motor voltage applied to the DC motor. High reliability can be ensured for detection of the rotation state of the DC motor.

8 Claims, 11 Drawing Sheets

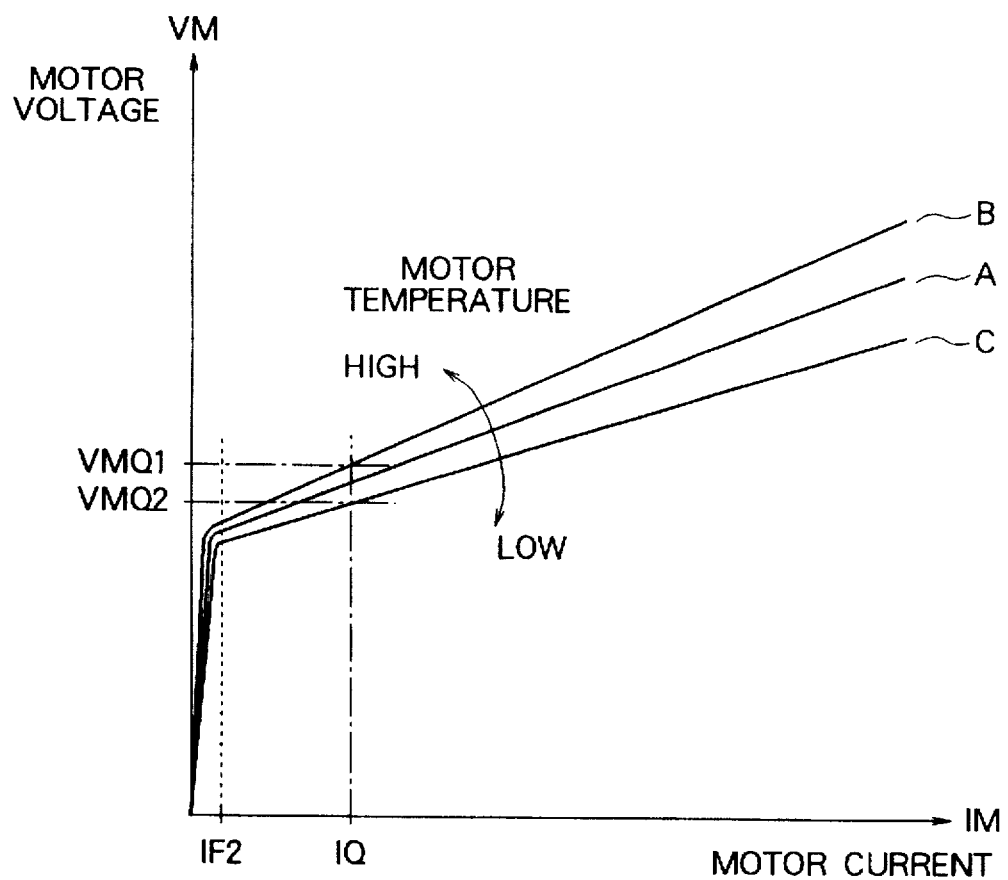

DC MOTOR DRIVEN POWER STEERING SYSTEM FOR A MOTOR VEHICLE

BACKGROUND OF THE INVENTION

Field of the Invention

The present invention relates to a DC motor driven power steering system for a motor vehicle for assisting a driver in steering the motor vehicle with an assist torque generated by a DC motor. More specifically, the present invention is concerned with a DC motor driven power steering system which is equipped with a facility for detecting the state of operation or rotation of the DC motor with high reliability, wherein information of the rotation state is utilized for controlling generation of the assist torque.

Description of Related Art

In the power steering system for automobiles or the like motor vehicles in which a DC motor is employed for generating the assist torque, it is required to detect the operation or rotation state of the DC motor through a feedback loop in order to generate the optimal steering assist torque while allowing detection of occurrence of abnormality in the power steering system.

Under the circumstances, in the DC motor driven power steering system known heretofore, a sensor means such as a rotary encoder, a tachometer generator or the like is employed for detecting an angular position and/or rotation speed of the DC motor as the information to be utilized for controlling the angular position as well as speed and acceleration of the DC motor to thereby control ultimately the steering assist torque.

However, the sensor means for detecting the motor information such as the rotation number of the DC motor and others as mentioned above is very expensive, which is of course disadvantageous from the economical viewpoint. For this reason, there have heretofore been proposed a variety of approaches which are designed for obtaining the rotation information of the DC motor by arithmetic estimation based on the outputs of the other sensors which are installed for the other purposes without resorting to the use of dedicated detecting means such as the rotary encoder or the like.

By way of example, there is disclosed in Japanese Unexamined Patent Application Publication No. 8190/1992 (JP-A-4-8190) a system in which a motor voltage applied across a DC motor and a motor current flowing therethrough are detected for estimating the rotation speed or number (rpm) of the DC motor on the basis of the detected motor voltage and the motor current. In another known system also disclosed in the above-mentioned publication, the motor rotation number is estimated on the basis of a motor current command value for commanding the current to flow through a DC motor and a motor current actually flowing through the motor. In any case, the motor rotation number estimated in this way is utilized in the steering control.

However, the motor rotation number estimating techniques mentioned above suffers a serious problem that the estimated value of the motor rotation number is often accompanied with remarkably large error in dependence on the motor driving method as adopted because the motor rotation number is estimated (or arithmetically determined, to say in another way) on the basis of the motor voltage and the motor current of the DC motor while taking into account the internal parameters thereof such as armature resistance, self-inductance, torque constant, viscosity resistance coefficient of the motor shaft, inertia of the rotor and others.

For better understanding of the background of the present invention, description will first be made in some detail of a DC motor driven power steering system known heretofore by reference to FIGS. 8 to 11.

FIG. 8 is a schematic diagram showing in general a structure of a conventional DC motor driven power steering control apparatus for a motor vehicle. As can be seen in the figure, a steering wheel 1 is operatively coupled to a steering shaft assembly which is composed of first to fourth steering shafts 2a to 2d so that rotational motion or torque of the steering wheel 1 is transmitted to the steering shafts.

A torque sensor 3 is provided in association with the steering wheel 1 for detecting a torque applied by a driver or operator to the steering wheel 1 for thereby outputting an electric signal T1 indicating the steering torque. More specifically, the steering wheel 1 and the torque sensor 3 are interlinked by means of the first steering shaft 2a. Additionally, connected operatively to the torque sensor 3 is the second steering shaft 2b at one end thereof, while a first gear 4 is mounted on the second steering shaft 2b at the other end thereof and meshes with a second gear 5, wherein the first and second gears 4 and 5 cooperate to constitute a reduction gear train. Further, the first gear 4 is connected to a first universal joint 6a by way of the third steering shaft 2c. The first universal joint 6a in turn is connected to a second universal joint 6b via the fourth steering shaft 2d. A pinion 7 is mounted on the second universal joint 6b and adapted to mesh with a threaded portion 8a of a rack 8. Mounted on the rack 8 at both ends thereof are first and second ball joints 9a and 9b, respectively, wherein tie rods 10a and 10b are coupled to both ends of the rack 8 via the first and second ball joints 9a and 9b, respectively. In addition, a DC motor 11 is operatively coupled to the second gear 5 for generating an assist torque to be applied to the power steering system under the control of a control apparatus 12 which is designed to control the steering operation in accordance with the electric signal T1 delivered from the torque sensor 3 to thereby assist the driver in steering the motor vehicle. The control apparatus 12 is supplied with an electric power from an onboard battery 13.

FIG. 9 is a block diagram showing generally a functional configuration of the control apparatus 12 shown in FIG. 8, i.e., a conventional DC motor driven power steering control apparatus. In FIG. 9, reference numerals 3, 11 to 13 denote same components as those designated by like numerals in FIG. 8. The control apparatus 12 for the DC motor driven power steering system is composed of elements 20 to 24 and 29 to 33, as described below.

Referring to FIG. 9, the control apparatus 12 includes a central processing unit (hereinafter referred to as the CPU in abbreviation) 20 which is programmed to perform various arithmetic processings involved in the control of the motor driven power steering operation. A power supply circuit 21 is connected to the battery 13 for supplying electric energy to various components of the control apparatus 12, although the power supply circuit 21 is shown to supply the electric power to the CPU 20 for simplification of illustration. An input interface circuit 22 is provided for fetching and conditioning the electric signal T1 outputted from the torque sensor 3. More specifically, the electric signal T1 indicative of a steering torque applied to the steering wheel 1 by the driver is inputted to the CPU 20 via the input interface circuit 22 to be processed thereby in the manner which will be elucidated later on, whereby a motor driving signal DM is outputted from the control apparatus 12. A motor drive circuit 23 is provided for generating PWM (Pulse-Width Modulated) control signals PC1 to PC4 on the basis of the motor driving signal DM. Further, a motor current detection circuit 24 is provided to detect a motor current IM flowing through the DC motor 11 for generating a motor current signal IM which is inputted to the CPU 20. Four switching elements such as electric field effect transistors (hereinafter referred to as the FET in abbreviation) 29 to 32 cooperate with the DC motor 11 to constitute an H-bridge commutation circuit BR. One pair of the FETs 29 and 32 as well as the other pair of the FETs 30 and 31 is adapted to be controlled or turned on and off by the PWM control signals PC1 to PC4 so that the DC motor 11 is caused to rotate reversibly in either the forward or backward (reverse) direction for generating the steering assist torque. A source voltage detection circuit 33 serves to detect a power supply voltage supplied to the bridge commutation circuit BR from the battery 13, wherein the output signal VB of the circuit 33 indicating the power supply voltage VB as detected is also inputted to the CPU 20. Finally, there is provided a means for detecting a motor voltage VM which is applied to the DC motor 11, although this detecting means is omitted from illustration.

Next, operation of the conventional DC motor driven power steering system of the structure described above will be reviewed briefly.

The CPU 20 generates the motor driving signal DM on the basis of the electric signal T1 outputted from the torque sensor 3 and at the same time estimates the rotation number (rpm) of the DC motor 11 on the basis of the motor current IM supplied from the motor current detection circuit 24 and the motor voltage VM supplied from the motor voltage detecting means (not shown). On the other hand, the motor drive circuit 23 generates the PWM control signals PC1 to PC4 on the basis of the motor driving signal DM for thereby driving the DC motor 11 via the FETs 29, . . . , 32 of the bridge commutation circuit BR. The torque thus generated by the DC motor 11 is transmitted to the steering shafts 2b and 2a via the gear train composed of the second gear 5 and the first gear 4, as a result of which an assist torque of appropriate magnitude and direction is applied to the steering wheel 1.

Next, description will turn to operation of the CPU 20 for estimating the rotation speed or number (rpm) of the DC motor 11 by reference to FIGS. 10 and 11 which graphically illustrate motor voltage (VM)-versus-motor current (IM) characteristics of the DC motor 11 with temperature thereof being used as a parameter, wherein FIG. 10 shows the characteristic in the case where one (e.g., 29) of each pair (e.g. 29 and 32) of the FETs 29 to 32 constituting the bridge commutation circuit BR is turned on and off by the PWM control signal while the other (e.g. 32) is held constantly in the closed or ON-state, whereas FIG. 11 shows the characteristic in the case where both of the paired FETs (e.g. 29 and 32 or 30 and 31) are turned on and off by the PWM control signal simultaneously or independently from each other.

More specifically, the voltage-versus-current characteristics illustrated in FIG. 10 are obtained when the DC motor 11 is driven by turning on/off the FET 29 with the FET 32 being maintained in the on-state while the FETs 30 and 31 are held in the off-state by the PWM control signals PC1 to PC4 outputted from the motor drive circuit 23. On the other hand, the voltage-versus-current characteristics shown in FIG. 11 are obtained by driving the DC motor 11 by switching both the FETs 29 and 32 with the PWM control signal while holding the FETs 30 and 31 in the off-state.

In both of FIGS. 10 and 11, the motor current IM flowing through the DC motor 11 is taken along the abscissa with the motor voltage VM, i.e., the voltage applied across the DC motor 11 in the non-rotating state thereof being taken along the ordinate, wherein a curve A represents the characteristic when the motor temperature is at a room temperature, a curve B represents the same at a high motor temperature, and a curve C represents the same when the motor temperature is low. Further, in FIGS. 10 and 11 reference characters IF1 and IF2 designate, respectively, lower limit values of the motor current IM for the ranges in which the characteristic curves A to C exhibit linearity.

As can be seen in FIGS. 10 and 11, the relation between the motor voltage VM and the motor current IM changes as a function of the temperature of the motor. In other words, when the DC motor 11 is at a room temperature, the relation mentioned above is such as represented by the characteristic curve A. At a higher temperature of the motor 11, the relation is such as represented by the characteristic curve B, while at a lower temperature of the DC motor 11, the motor voltage VM thereof changes as a function of the motor current IM as indicated by the characteristic curve C. Furthermore, when the motor current IM is smaller than the lower limit value IF1 or IF2, all the characteristic curves A to C assume nonlinear forms, respectively.

Referring to FIG. 10, let's assume that the DC motor 11 is in the non-rotating state when the motor current IM is equal to a value ID. In that case, the motor voltage VM assumes a value which falls within a range given by the expression $VMD1 \geq VM \geq VMD2$. Further, in the case where the DC motor 11 is in the non-rotating state when the motor current IM assumes a value IQ in the driving mode illustrated in FIG. 11, the motor voltage VM assumes a value within a range given by the expression $VMQ1 \geq VM \geq VMQ2$.

Furthermore, comparison of the characteristic curves illustrated in FIG. 10 with those of FIG. 11 shows that the characteristic curves A to C rises up rather gently at a relatively low rate of the motor voltage VM when one of each pair of the FETs is controlled by the PWM control signal (FIG. 10), while the characteristic curves A to C rises up steeply at a relatively high rate of the motor voltage VM when both FETs of one pair are controlled by the PWM signal (FIG. 11).

It is further to be mentioned that when the DC motor 11 is rotating in a desired direction under a load, there will be detected the motor voltage VM which is lower than that given by the characteristic curve A, B or C while when the DC motor 11 is rotating in the regenerative mode (i.e., in the direction in which electric power is generated by the DC motor 11), the motor voltage VM which is higher than that given by the characteristic curve A, B or C will be detected.

As will now be appreciated from the foregoing discussion, the rotation number (rpm) of the DC motor 11 can arithmetically be determined or estimated on the basis of a difference between the motor voltage VM detected at a given motor current IM (=ID) and the motor voltage (VMD1 to VMD2) or motor voltage (VMQ1 to VMQ2) located on the relevant characteristic curve.

However, the characteristic between the motor current IM and the motor voltage VM becomes different as the motor temperature changes regardless of the driving scheme as adopted, as indicated by the characteristic curves A to C in FIGS. 10 and 11. Besides, the characteristic curves A to C will change under the influence of heat generation internally of the DC motor 11.

Additionally, the motor voltage-versus-motor current characteristics differ remarkably from one another in respect to the rise-up voltage, slope thereof and the lower limit values (IF1, IF2) of the linear ranges. Of course, the characteristic will vary significantly in dependence on the motor driving schemes as adopted (compare FIG. 10 with FIG. 11).

By way of example, in the case of the characteristics illustrated in FIG. 10, although a relatively large margin can be ensured for the detection of a high motor voltage VM, the margin for the detection of a low motor voltage becomes small. By contrast, in the case of the characteristics illustrated in FIG. 11, a large margin is available for the detection of the low motor voltage VM whereas the margin for the detection of high motor voltage VM is narrowed.

As will now be apparent from the above analysis, estimation of the rotation number or speed (rpm) of the DC motor 11 on the basis of only the motor voltage VM, the motor current IM and the internal parameters thereof will be accompanied with significant error due to the various influential factors such as those mentioned above. In order to decrease the error involved in the estimation, it is required to change the method for estimating the rotation number of the DC motor 11 in dependence on the schemes or modes for driving the DC motor 11. However, there has been proposed no DC motor driven power steering system which incorporates the means for changing the estimation methods as mentioned above.

Finally, it should also be mentioned that in the DC motor driven power steering system in which the motor driving scheme where the one of each pair of the FETs is held in the conducting or ON-state with the other being switched or controlled by the PWM control signal (FIG. 10) can be changed over with the scheme where both FETs of each pair are switched on and off by the PWM control signal simultaneously or independently from each other (FIG. 11), error involved in the estimation of the rotation number of the DC motor 11 will become different every time the driving schemes mentioned above are changed over.

In the DC motor driven power steering system known heretofore, estimation of the rotation number or speed of the DC driving motor on the basis of the motor voltage VM, the motor current IM and the internal parameters without resorting to use of any proper rotation number detecting means which are generally expensive results in remarkably large error, as described above, as a result of which realization of optimal steering control is difficult or practically impossible, giving rise to a problem.

Furthermore, in the conventional DC motor driven power steering system in which the scheme for driving the DC driving motor by holding one of each pair of the FETs in the ON-state while turning on/off the other FET by the PWM control signal (FIG. 10) is changed over with the driving scheme in which both the FETs of each pair are turned on/off by the PWM control signal simultaneously or independently (FIG. 11), error involved in the estimated value of the motor rotation number becomes different significantly every time the aforementioned motor driving schemes are changed over, incurring error in the estimated or detected motor rotation number.

SUMMARY OF THE INVENTION

In the light of the state of the art described above, it is an object of the present invention to provide a DC motor driven power steering system for a motor vehicle which system is imparted with a capability for detecting rotation state of the DC motor with high accuracy and enhanced reliability.

Another object of the present invention is to provide a DC motor driven power steering system for a motor vehicle which system is imparted with a capability of minimizing error involved in the estimation of the rotation state of the DC motor even when schemes for driving the motor are changed over from one to another.

Yet another object of the present invention is to provide the DC motor driven power steering system which can be implemented inexpensively.

A first aspect of the present invention involves a DC motor driven power steering system for a motor vehicle, which system includes a DC motor, two sets of paired FETs connected as a bridge commutation circuit together with the motor for driving it in either a forward or a backward direction, and a drive circuit for controlling the operation of the motor by controlling one of the paired FETs with a pulse-width modulated control signal while holding the other FET in a conducting state. The motor current and the voltage applied to the bridge commutation circuit are detected, and the voltage applied to the motor is estimated on the basis of the voltage applied to the bridge circuit and the pulse-width modulated control signals. The motor rotation is then detected based on the motor current and the estimated motor voltage. With such a system, high reliability can be ensured for the detection of the motor operation state in the drive mode in which one of the paired FETs is controlled by the PWM signal with the other FET being held constantly in the conducting state.

According to a second aspect of the invention, and as an alternative, both of the paired FETs may be controlled with pulse-width modulated control signals, with equally reliable rotation detection results.

According to a third aspect of the invention a motor terminal biasing circuit applies a bias voltage to at least one of paired terminals of the DC motor, a circuit connected to one of the motor terminals detects the voltage thereat, and the motor rotation state is detected on the basis of the motor terminal voltage in the state in which the DC motor is not being driven, i.e. energized.

By applying a bias voltage to at least one terminal of the DC motor and detecting the motor terminal voltage, it is possible to detect the rotation number of the motor, or at least information indicating that the motor is rotating, even when the motor is not positively being driven. Thus, the overall reliability in detecting the rotation state of the motor can be improved without incurring any noticeable expense.

According to a fourth aspect of the invention the DC motor is controlled either in a first motor drive mode in which one of the paired FETs is controlled with a pulse-width modulated control signal with the other FET being held in the closed or conducting state, or in a second motor drive mode in which both of the FETs are controlled with pulse-width modulated control signals. Means are provided for detecting the rotating state of the motor in dependence on the motor drive modes, and for changing the motor rotation detecting means in dependence on the motor drive modes, and a multiplier is provided for multiplying the value outputted from the motor rotation detecting means with a scaling factor.

By detecting the rotation state of the motor in dependence on the drive modes, and multiplying the detected value with a scaling factor or correcting coefficient, any error included in the estimated motor rotation number can be suppressed to a minimum, whereby reliability in detecting the motor rotation state can correspondingly be improved.

The system may further include an interval setting means for setting an interval following a change of the motor drive mode, so that the motor rotation detecting means is inhibited from detecting the rotation state of the motor during a period corresponding to the interval. This protects against any influence of transient factors, whereby high accuracy and enhanced reliability can be ensured for the detection of the rotation state of the motor.

In addition, means may be included for correcting the detected value outputted from the motor rotation detecting means during the aforementioned interval or period with a linear delay factor, which diminishes any error involved in the arithmetic operation.

BRIEF DESCRIPTION OF THE DRAWINGS

In the course of the description which follows, reference is made to the drawings, in which:

FIG. 11 is a view for graphically illustrating motor voltage-versus-motor current characteristics of the DC motor with temperature thereof being used as a parameter in a driving mode different from that shown in FIG. 10.

DESCRIPTION OF THE PREFERRED EMBODIMENTS

Now, the present invention will be described in detail in conjunction with what is presently considered as preferred embodiments thereof by reference to the drawings.

Embodiment 1

Figure 1:
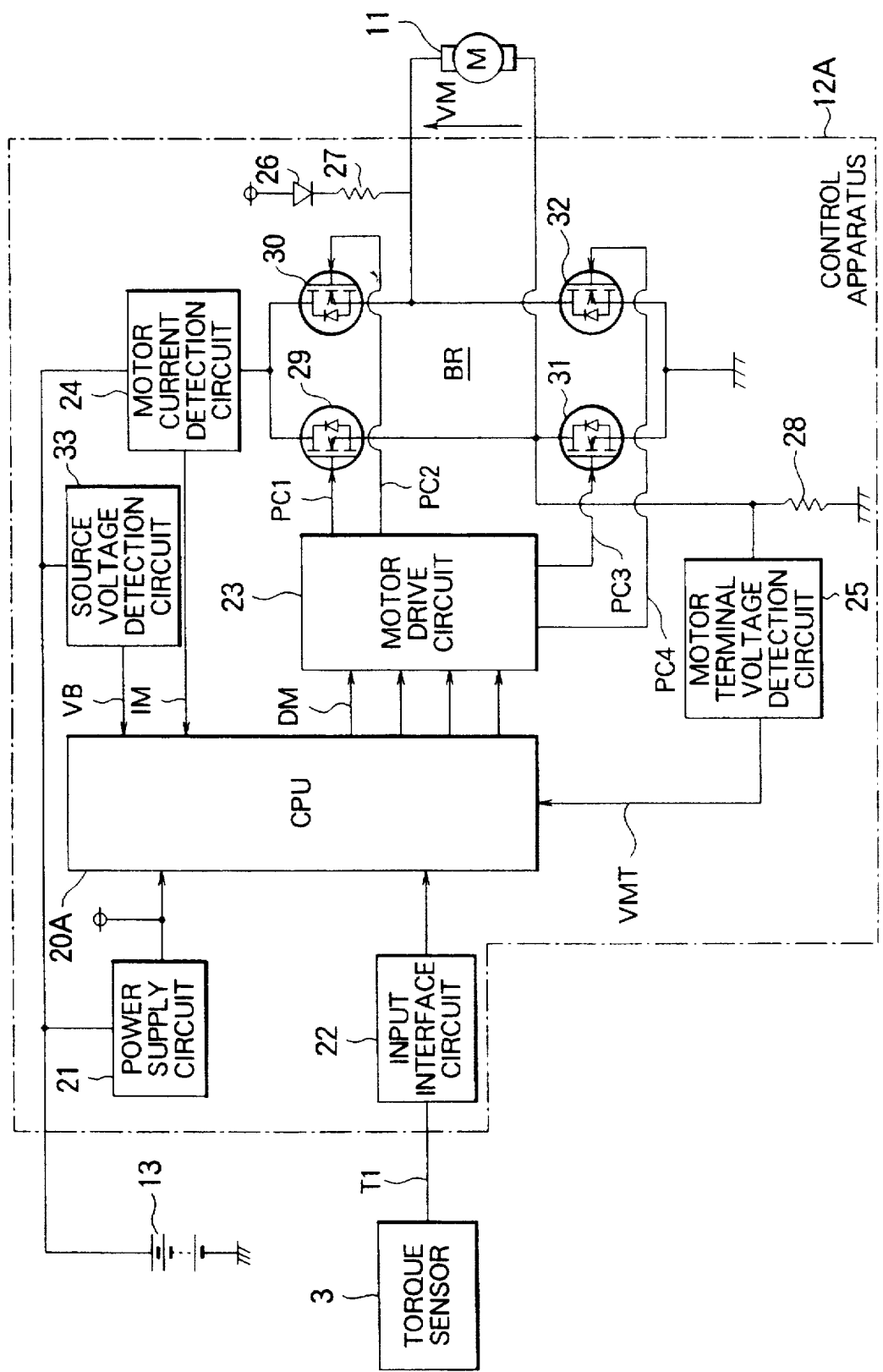
FIG. 1 is a block diagram showing an arrangement of a DC motor driven power steering system for a motor vehicle according to a first embodiment of the present invention.
Figure 8:
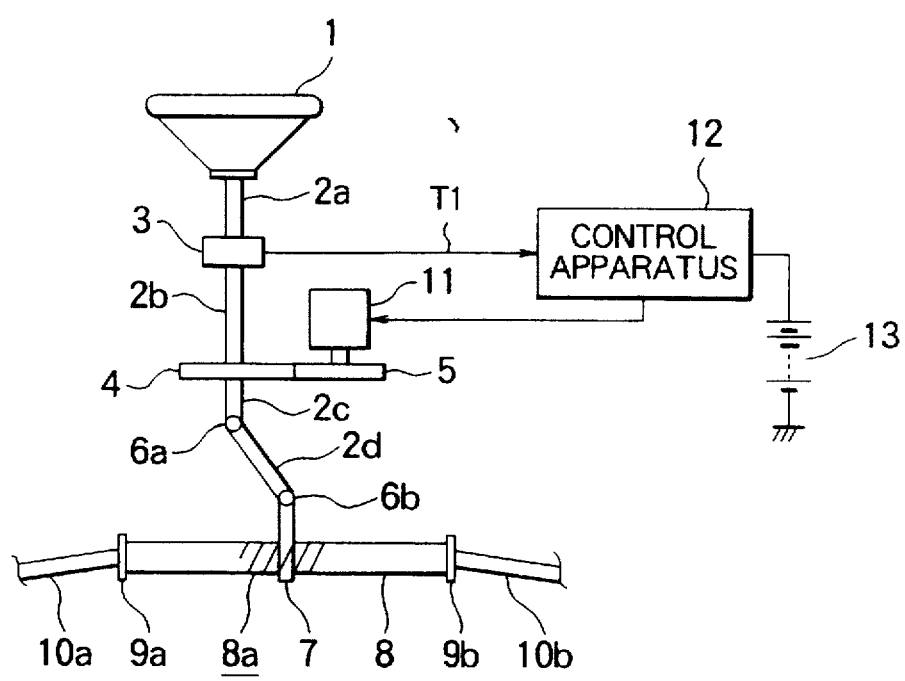
FIG. 8 is a schematic diagram showing in general a structure of a DC motor driven power steering system for a motor vehicle known heretofore.
Figure 9:
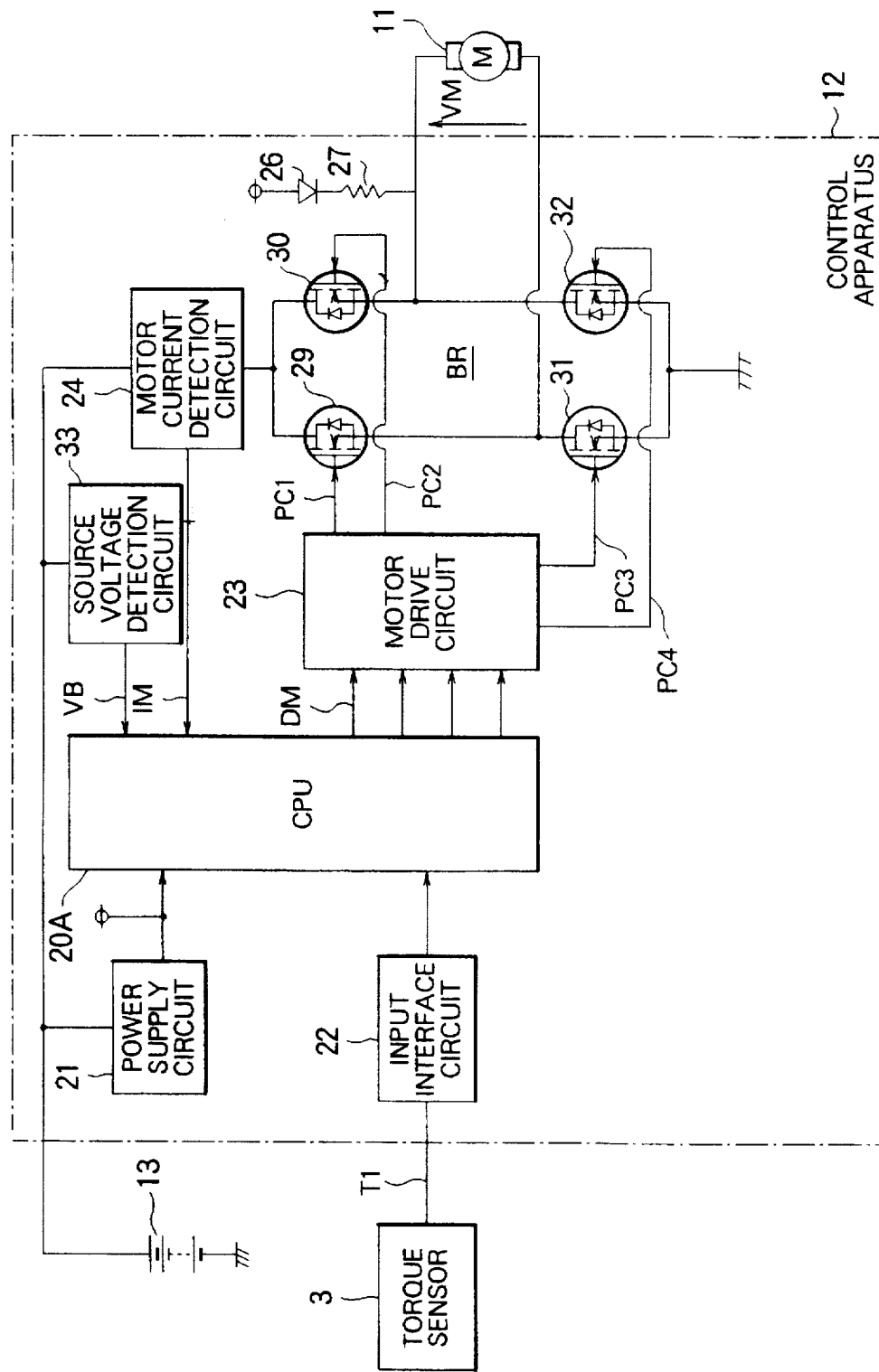
FIG. 9 is a block diagram showing generally a functional configuration of a control apparatus employed in the system shown in FIG. 8.

FIG. 1 is a block diagram showing a DC motor driven power steering system for a motor vehicle according to a first embodiment of the present invention, wherein reference characters 12A and 20A denote a control apparatus and a CPU which correspond, respectively, to the control apparatus 12 and the CPU 20 shown in FIG. 9. Further, in this figure, components which are same as or equivalent to those shown in FIG. 9 are denoted by like reference characters. The mechanical structure of the DC motor driven power steering system to which the instant embodiment of the invention is applied is essentially same as the structure described hereinbefore by reference to FIG. 8.

Referring to FIG. 1, the DC motor driven power steering system according to the instant embodiment of the invention additionally includes a motor terminal voltage detection circuit 25 which is connected to one of the terminals of the DC motor 11, wherein a signal VMT indicative of a motor terminal voltage as detected by the motor terminal voltage detection circuit 25 is inputted to the CPU 20A. Further connected to the other terminal of the DC motor 11 is a diode 26 for applying a pull-up bias voltage thereto. To this end, the diode 26 has an anode connected to the power supply circuit 21 and a cathode connected to the aforementioned other terminal of the DC motor 11 via a resistor 27. On the other hand, a resistor 28 is inserted between the aforementioned one terminal of the DC motor 11 and the ground potential.

The series circuit comprised of the diode 26 and the resistors 27 and 28 constitutes a motor terminal biasing circuit for biasing at least one of the paired terminals of the DC motor 11. More specifically, the power supply voltage VB is divided by the resistors 27 and 28 of the motor terminal biasing circuit so that a voltage resulting from the voltage division is applied to the DC motor 11 as a bias voltage for canceling out a voltage induced by rotation of the DC motor 11. Thus, even when a voltage of minus polarity is generated by the DC motor 11, the motor terminal voltage VMT of the DC motor 11 is detected as a voltage value of plus polarity which is suited for the processing described below.

The electric signal T1 indicating the steering torque applied to the steering wheel 1 as well as and the electric signals indicating the motor current IM, the power supply voltage VB supplied to the bridge commutation circuit BR and the motor terminal voltage VMT, respectively, are inputted to the CPU 20A, which in turn generates on the basis of these input signals the motor driving signal DM indicating duty ratios of the PWM control signals PC1 to PC4 mentioned previously for effectuating the PWM control of the FETs constituting the bridge commutation circuit BR.

The CPU 20A includes a motor voltage estimating means for arithmetically deriving an estimated motor voltage VMS applied to the DC motor 11 on the basis of the power supply voltage VB supplied to the bridge commutation circuit BR and the PWM control signals (PC1, . . . , PC4), a motor rotation detecting means for detecting the rotating state of the DC motor 11 on the basis of the motor current IM and the estimated motor voltage VMS, and a motor drive state decision means for deciding whether or not the DC motor 11 is being driven, i.e. energized.

In the description which follows, it is assumed that the motor drive circuit 23 can be operated in either of a first motor drive mode in which the motor drive circuit 23 responds to the motor driving signal DM supplied from the CPU 20A for driving the DC motor 11 by holding in the conducting state on one of each pair of FETs constituting the bridge commutation circuit BR while controlling the other FET of the pair with the PWM control signal and a second motor drive mode in which the motor drive circuit 23 drives the DC motor 11 by controlling both the FETs of each pair with PWM control signal.

The motor rotation detecting means incorporated in the CPU 20A serves to detect the rotating state of the DC motor 11 on the basis of the motor current IM and the estimated motor voltage VMS by taking into account the motor drive mode when the DC motor 11 is being driven while detecting the operation state of the DC motor 11 on the basis of the motor terminal voltage VMT when the DC motor 11 is not being driven.

For realizing the detection of the motor operating states mentioned above, the CPU 20A includes a change-over means for switching the motor rotation detecting means in dependence on the aforementioned motor drive modes of the DC motor 11 and a multiplier means for multiplying the detected value outputted from the motor rotation detecting means with a matching or correcting coefficient.

Now, operation of the DC motor driven power steering control apparatus according to the instant embodiment of the invention will be described by referring to FIGS. 2 to 5 together with the characteristic diagrams of FIGS. 10 and 11.

Figure 10:
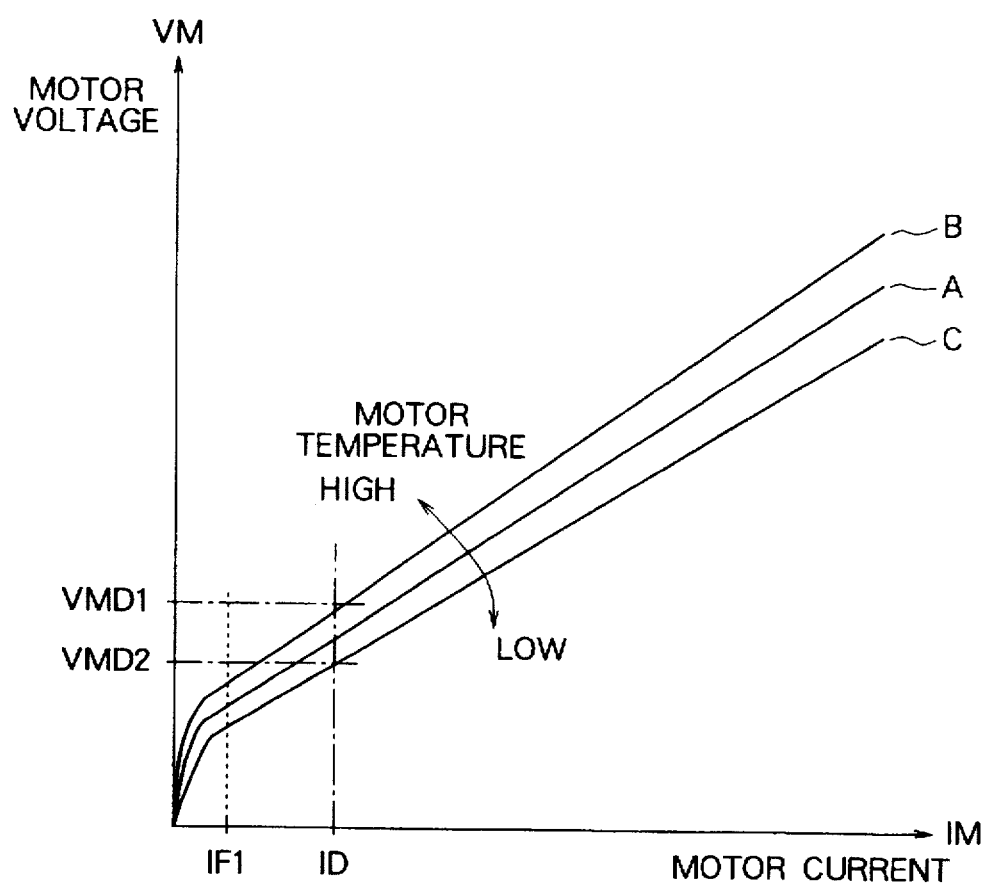
FIG. 10 is a view for graphically illustrating motor voltage-versus-motor current characteristics of a DC motor with temperature thereof being used as a parameter in a conventional power steering system.

By detecting the motor current IM, it is possible to determine on the basis of the characteristics shown in FIG. 10 in the first motor drive mode mentioned hereinbefore the range of the motor voltage VM in which the DC motor 11 is not rotated. By way of example, in case the DC motor 11 is in the non-rotating state when the motor current IM assumes the value ID (see FIG. 10), the motor voltage VM is smaller than the upper limit value VMD1 inclusive and greater than the lower limit value VMD2 inclusive (i.e., VMD2≦VM≦VMD1).

Figure 2:
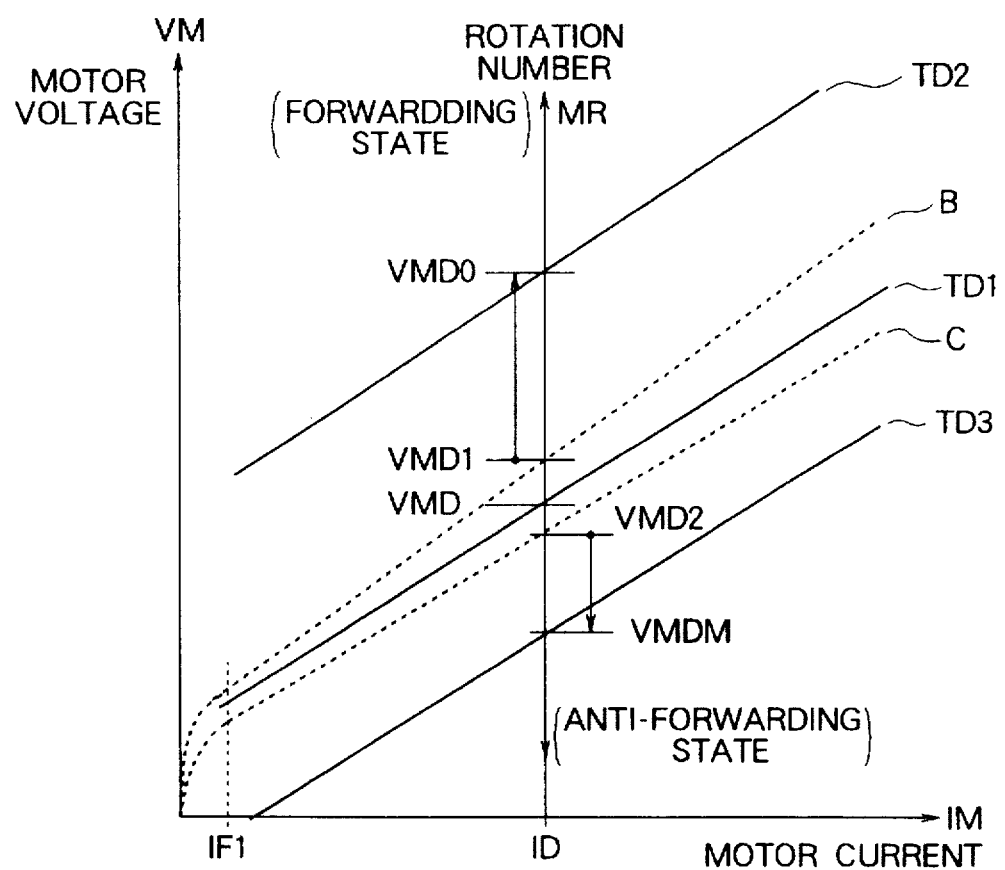
FIG. 2 is a characteristic diagram showing graphically a characteristic relation between a motor current and a motor voltage in the system according to the first embodiment of the invention for illustrating operation thereof.

FIG. 2 is a characteristic diagram which corresponds to that of FIG. 10 and which graphically illustrates relation between the motor current IM and the motor voltage VM when the DC motor 11 is rotated in the first motor drive mode mentioned previously. In FIG. 2, symbols B, C, VMD1, VMD2, IF1 and ID have same meanings as elucidated hereinbefore.

In FIG. 2, a curve TD1 represents a motor current-versus-motor voltage characteristic of the DC motor 11 when it is in the non-rotating state, a curve TD2 represents the corresponding characteristic in the state in which the DC motor 11 is urged to further rotate in the controlled or commanded rotating direction under the influence of external force(s) (this state will hereinafter be referred to as the forwarding state), and a curve TD3 represents the characteristic in the state in which the DC motor 11 is urged to rotate in the direction opposite to the controlled rotating direction under the influence of external force(s) (hereinafter this direction will be referred to as the anti-forwarding).

In FIG. 2, voltage values VMD, VMDO and VMDM represent motor voltages on the characteristic curves TD1, TD2 and TD3, respectively, in the state where the motor current IM assumes the value ID. More specifically, the voltage value VMD represents the motor voltage VM on the characteristic curve TD1 in the non-rotating state of the DC motor 11, the voltage value VMDO represents the motor voltage VM on the characteristic curve TD2 in the forwarding state, and the voltage value VMDM represents the motor voltage VM on the characteristic curve TD3 in the anti-forwarding state.

In the following, description will be made of a procedure for estimating the motor rotation number MR when the motor current IM is equal to the value ID.

In the first place, on the basis of a motor voltage range determined by the motor temperature characteristic, the upper limit value VMD1 and the lower limit value VMD2 of the motor voltage VM in the non-rotating state of the DC motor 11 is determined when the motor current IM is equal to the value ID.

Subsequently, it is decided whether the estimated motor voltage VMS is greater than the upper limit value VMD1 or smaller than the lower limit value VMD2 or whether the estimated motor voltage VMS falls within the range given by the expression VMD2≦VM≦VMD1.

By way of example, when the estimated motor voltage VMS assumes the motor voltage value VMD on the characteristic curve TD1, it is then decided that the DC motor 11 is in the non-rotating state, because the motor voltage value VMD is greater than the lower limit value VMD2 and smaller than the upper limit value VMD1.

On the other hand, when the estimated motor voltage VMS assumes the motor voltage value VMDO on the characteristic curve TD2, it is then decided that the DC motor 11 is in the forwarding state, because the motor voltage value VMDO is greater than the upper limit value VMD1. In this case, since the difference between the motor voltage VMDO and the upper limit value VMD1 is in proportion to the motor rotation number MR, it is possible to estimate the motor rotation number MR on the basis of the abovementioned difference (i.e., VMDO–VMD1).

Further, when the estimated motor voltage VMS assumes the motor voltage value VMDM on the characteristic curve TD3, it is then decided that the DC motor 11 is in the anti-forwarding state because the motor voltage value VMDM is smaller than the lower limit value VMD2. In this case, since the difference between the motor voltage VMDM and the lower limit value VMD2 is proportional to the motor rotation number MR, it is possible to estimate the motor rotation number MR on the basis of the voltage difference (VMDM–VMD2).

Parenthetically, in FIG. 2, it is noted that when the DC motor 11 is in the anti-forwarding state and when the rotation number in the backward direction (i.e., the rotation number in the anti-forwarding state) is so large that the terminal voltage assumes the minus polarity, estimation of the motor rotation number MR becomes difficult although it is possible to determine whether the DC motor 11 is rotating or not. Of course, it goes without saying that the motor rotation number MR can easily be estimated by using a motor voltage detecting device or circuit although it involves more or less expensiveness.

Furthermore, when the motor current IM is smaller than the lower limit value IF1 of the linear range, it is difficult to estimate the motor rotation number MR because the characteristic curves become nonlinear, although the decision as to whether the DC motor 11 is rotating or not can be made.

On the other hand, in the second motor drive mode, the range of the motor voltage VM in which the DC motor 11 is in the non-rotating state as well as the operation state of the DC motor 11 can be determined on the basis of the characteristics shown in FIG. 11. By way of example, in case the DC motor 11 is in the non-rotating state when the motor current IM assumes the value IQ, it can be decided that the motor voltage VM is smaller than the upper limit value VMQ1 inclusive and greater than the lower limit value VMQ2 inclusive.

Figure 3:
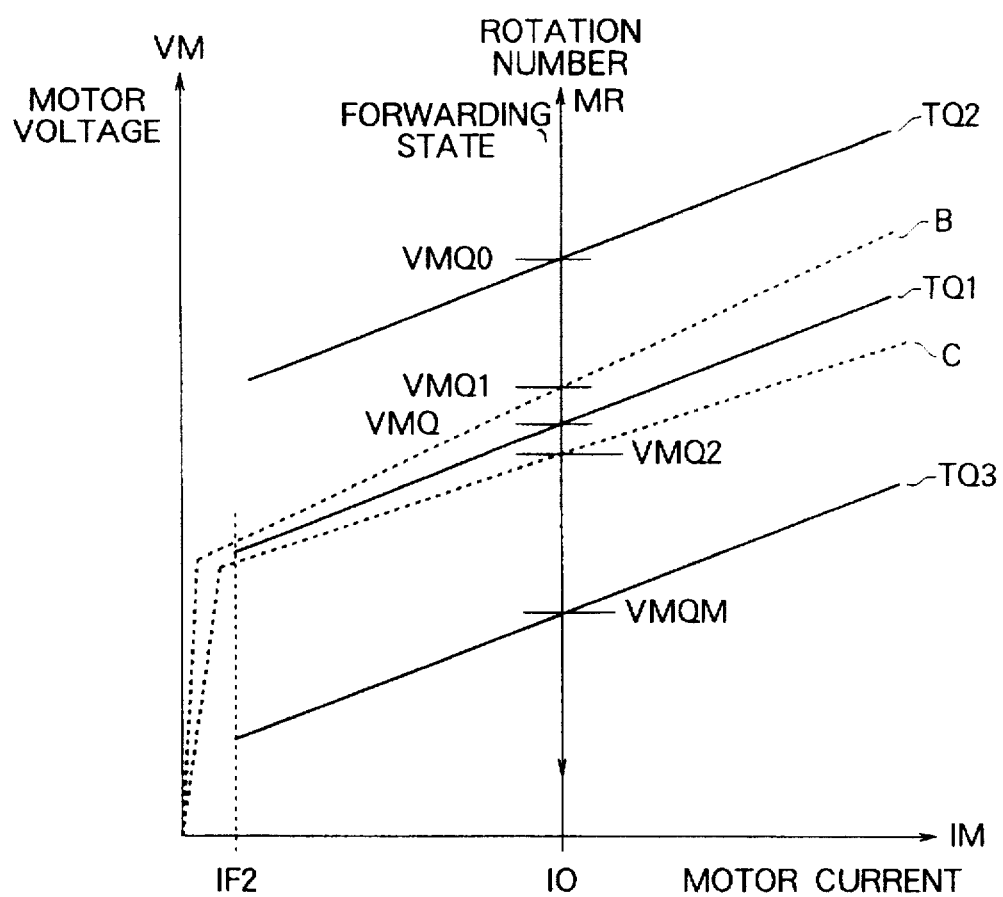
FIG. 3 is a characteristic diagram showing graphically a characteristic relation between a motor current and a motor voltage in the system according to the first embodiment of the invention for illustrating operation thereof.

FIG. 3 is a characteristic diagram corresponding to that of FIG. 11 and shows motor current (IM)-versus-motor voltage (VM) characteristics in the state in which the DC motor 11 is driven in the second motor drive mode in which both the FETs of each pair are controlled by the PWM control signals. In the figure, symbols B, C, VMQ1, VMQ2, IF2 and IQ have the same meanings as defined hereinbefore in conjunction with FIG. 11.

In FIG. 3, a curve TQ1 represents the characteristic of the DC motor 11 in the non-rotating state thereof, a curve TQ2 represents the characteristic of the DC motor 11 in the forwarding state, and a curve TQ3 represents the characteristic in the anti-forwarding state. Further, voltage values VMQ, VMQO and VMQM represent the motor terminal voltages on the characteristic curves TQ1, TQ2 and TQ3, respectively, when the motor current IM assumes the value IQ.

In the following, description will be made of a procedure for estimating the motor rotation number MR of the DC motor 11 when the motor current IM is equal to the value IQ.

At first, on the basis of a motor voltage range determined by the temperature characteristic, the upper limit value VMQ1 and the lower limit value VMQ2 of the motor voltage VM in the non-rotating state of the DC motor 11 is determined at the time point when the motor current IM is equal to the value IQ.

Subsequently, it is decided whether the estimated motor voltage VMS is greater than the upper limit value VMQ1 or smaller than the lower limit value VMQ2 or whether the estimated motor voltage VMS falls within the range given by the expression VMQ2≦VM≦VMQ1.

By way of example, when the estimated motor voltage VMS assumes a value VMQ on the characteristic curve TQ1, it is then decided that the DC motor 11 is in the non-rotating state, because the voltage value VMQ is greater than the lower limit value VMQ2 and smaller than the upper limit value VMQ1.

On the other hand, when the estimated motor voltage VMS assumes a voltage value VMQO on the characteristic curve TQ2, it is then decided that the DC motor 11 is in the forwarding state, because the voltage value VMQO is greater than the upper limit value VMQ1. In this case, since the difference between the motor voltage VMQO and the upper limit value VMQ1 is in proportion to the motor rotation number MR, it is possible to estimate the motor rotation number MR on the basis of the above-mentioned voltage difference (i.e., VMQO-VMQ1).

Further, when the estimated motor voltage VMS assumes a voltage value VMQM on the characteristic curve TQ3, it can then be decided that the DC motor 11 is in the antiforwarding state because the voltage value VMQM is smaller than the lower limit value VMQ2. In this case, since the difference between the motor voltage VMQM and the lower limit value VMQ2 is proportional to the motor rotation number MR, it is possible to estimate the motor rotation number MR on the basis of the voltage difference (VMQM-VMQ2).

Parenthetically, in FIG. 3, it is noted that when the DC motor 11 is in the forwarding state and when the rotation number in the forward direction (i.e., the rotation number in the forwarding state) is so large that the terminal voltage exceeds the power supply voltage VB, estimation of the motor rotation number MR becomes difficult although it is possible to determine whether the DC motor 11 is rotating or not. Further, in the range where the motor current IM is smaller than the lower limit value IF2, each of the characteristic curves mentioned above becomes nonlinear. Consequently, estimation of the motor rotation number MR becomes difficult even though it is possible to decide whether or not the DC motor 11 is rotating.

Figure 4:
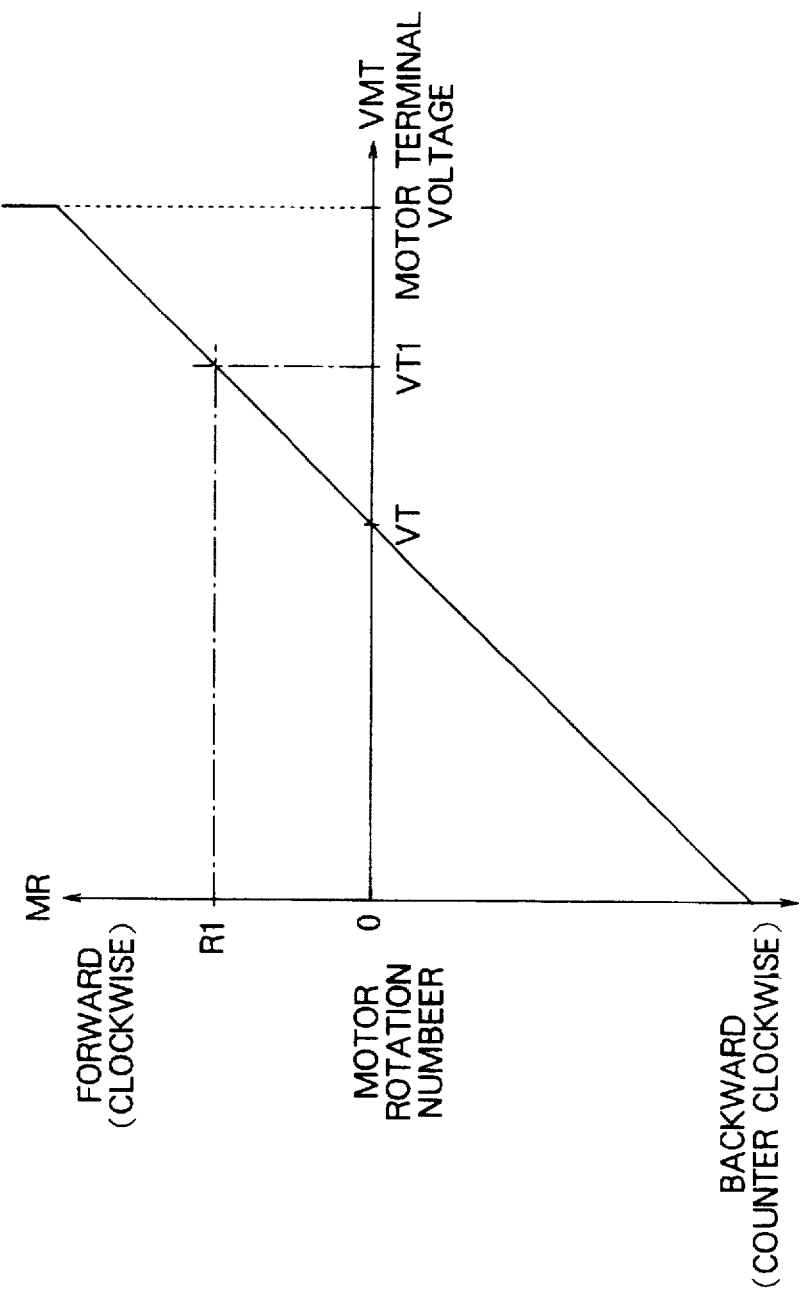
FIG. 4 is a characteristic diagram showing graphically a characteristic relation between a motor rotation number and a terminal voltage of a DC motor for illustrating operation of the system according to the first embodiment of the invention.

FIG. 4 is a characteristic diagram graphically illustrating a relation between the motor rotation number MR and the motor terminal voltage VMT of the DC motor 11 in the non-drive state thereof (i.e., when it is not rotating) with a bias voltage VT being applied by the bias circuit constituted by the diode 26, the resistor 27 and the resistor 28.

By way of example, when the motor terminal voltage VMT is equal to the bias voltage VT, this means that the DC motor 11 is in the non-rotating state (with the generated voltage being zero), whereas when the motor terminal voltage VMT assumes a voltage value VT1 which exceeds the bias voltage VT, indicating that the generated voltage is of plus polarity, the motor rotation number MR assumes a value R1. This motor rotation number MR (=R1) can be detected on the basis of the voltage of plus or minus polarity generated by the DC motor 11 under the influence of the external force(s).

Figure 5:
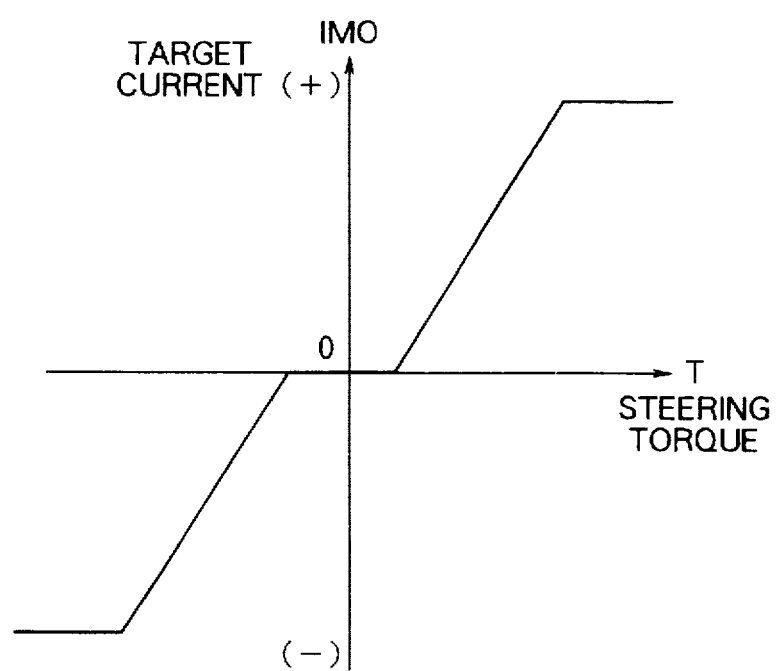
FIG. 5 is a characteristic diagram for illustrating operation of the DC motor driven power steering system according to the first embodiment of the invention and shows a relation between a steering torque and a target motor current value.

FIG. 5 is a characteristic diagram for illustrating graphically a relation between the steering torque T indicated by the electric signal T1 and a desired or target motor current value IMO of the motor current IM. The target motor current value IMO for the steering torque T represents equivalently the assist torque as demanded.

Figure 6:
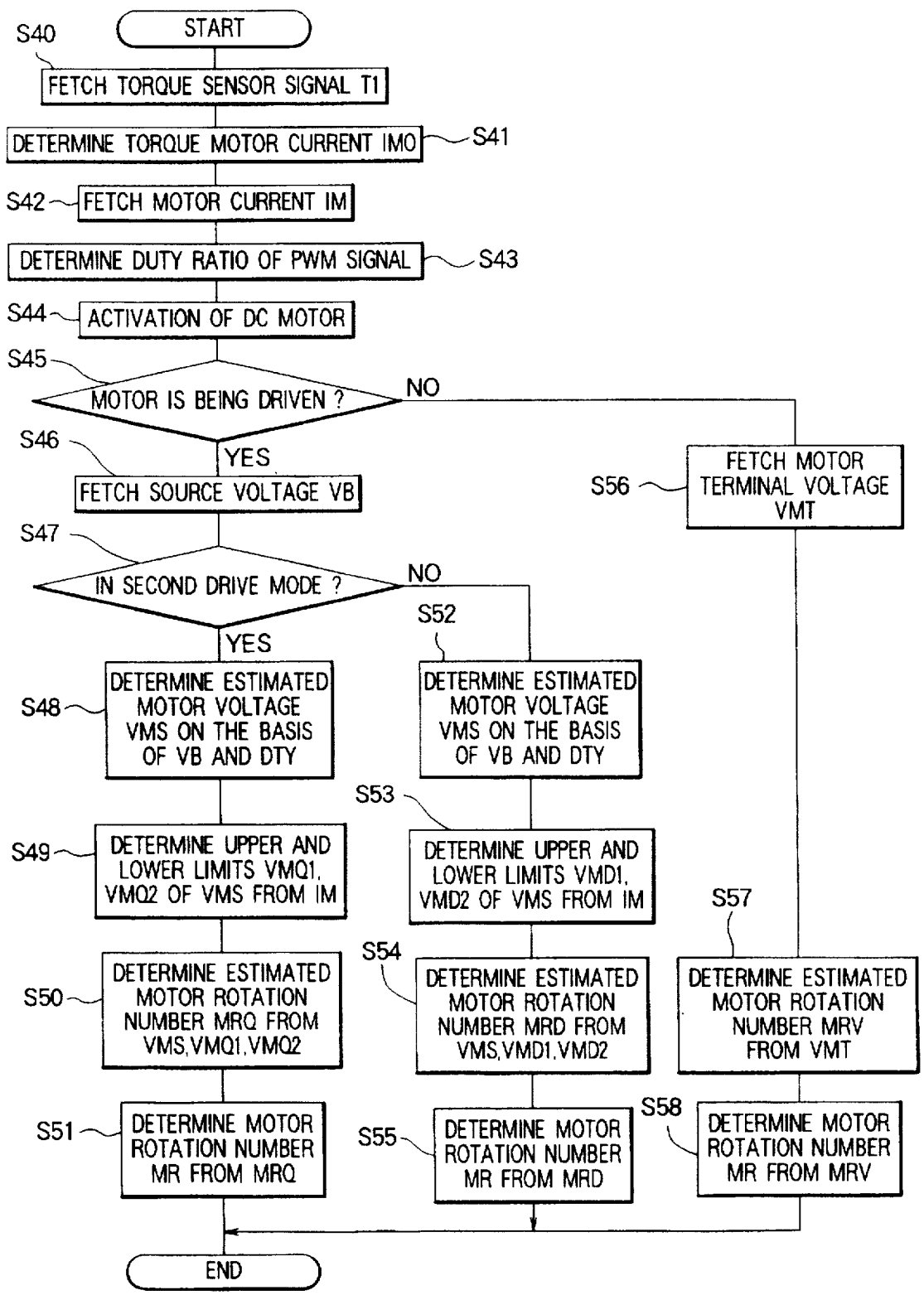
FIG. 6 is a flow chart for illustrating operation of the DC motor driven power steering system according to the first embodiment of the present invention.

Now, operation of the motor-driven power steering control apparatus according to the instant embodiment of the present invention will be described in detail by referring to FIG. 6 which is a flow chart for illustrating the processing procedure executed by the CPU 20A.

At first, the CPU 20A fetches the electric signal T1 outputted from the torque sensor 3 via the input interface circuit 22 as the torque data in a step S40.

Subsequently, the CPU 20A arithmetically determines the target motor current value IMO of the current to be supplied to the DC motor 11 in accordance with, for example, the characteristic illustration in FIG. 5 by using as a parameter the value of the electric signal T1 indicating the steering torque T (step S41).

In the meanwhile, the motor current detection circuit 24 detects the motor current IM flowing actually through the DC motor 11. The motor current IM as detected is inputted to the CPU 20A as the motor current data in a step S42.

In succession, the CPU 20A arithmetically determines the duty ratio DTY on the basis of a difference between the motor current IM measured actually and the target motor current value IMO so that the motor current IM coincides with the target motor current value IMO in a step S43, the duty ratio DTY thus determined being supplied to the motor drive circuit 23 in the form of the motor driving signal DM in a step S44. So long as the steps S40 to S44 are concerned, the processing procedure executed by the CPU of the control apparatus according to the instant embodiment of the invention is essentially same as that of conventional motor-driven power steering control apparatus.

Next, in a step S45, it is decided on the basis of the duty ratio DTY whether the DC motor 11 is being driven or not. In dependence on the result of this decision step, the procedure for estimating the motor rotation number MR is changed over, which will be described below.

When it is decided in the step S45 that the DC motor 11 is being driven (i.e., when this decision step results in affirmation or "YES"), the motor rotation number MR is estimated on the basis of the estimated motor voltage VMS in the manner described below. At first, the source voltage detection circuit 33 detects the power supply voltage VB applied to the H-like bridge commutation circuit BR which is comprised of the DC motor 11 and the four FETs 29 to 32, wherein the power supply voltage VB as detected is then inputted to the CPU 20A as the voltage data in a step S46.

Next, it is decided in a step S47 whether each pair of the FETs constituting the bridge commutation circuit BR is in the first drive mode (in which only one of the paired FETs is controlled by the PWM control signal with the other being held in the ON-state) or in the second drive mode (in which both the paired FETs are turned on/off by the PWM control signal).

More specifically, decision is made in the step S47 whether the FET 29 is turned on and off by the PWM control signal with the FET 32 being held in the conducting state (i.e., the first drive mode) or whether both the FETs 29 and 32 are driven by the PWM control signal (i.e., the second drive mode). In this case, it is assumed that decision is made as to whether the second drive mode is effectuated or not.

When it is decided in the step S47 that the second drive mode is effectuated, whereby both the FETs 29 and 32 are controlled by the PWM control signal (i.e., when the answer of the decision step S47 is affirmative "YES"), the CPU 20A determines the estimated motor voltage VMS on the basis of the power supply voltage VB applied to the bridge commutation circuit BR and the duty ratio DTY of the motor driving signal DM in a step S48.

In that case, the estimated motor voltage VMS can be determined in accordance with the following expression (1):

$$VMS=(DTY-DO) \times VB \times K1 \qquad (1)$$

In the expression (1), a term "DO" represents a dead zone of the duty ratio DTY of the motor driving signal DM (i.e., a range of the duty ratio DTY where no motor current IM flows notwithstanding of the fact that the duty ratio DTY is not zero), and K1 represents a coefficient.

Additionally, in a step S49, the upper limit value VMQ1 and the lower limit value VMQ2 used for deciding whether or not the DC motor 11 is in the non-rotating state are determined on the basis of the motor current IM (e.g. actually measured value IQ thereof).

Subsequently, the estimated motor voltage VMS determined in the step S48 is compared with the reference values VMQ1 and VMQ2 determined in the step S49, whereupon the estimated motor rotation number MRQ is determined on the basis of the result of the comparison (step S50).

More specifically, when the comparison mentioned above results in that VMS>VMQ1 (indicating that the DC motor 11 is in the forwarding state), the estimated motor rotation number MRQ in the second drive mode is determined in accordance with the following expression (2):

$$MRQ=(VMS-VMQ1) \times K2 \qquad (2)$$

where K2 represents a coefficient.

Further, when the condition that VMQ1≧VMS≧VMQ2 is satisfied, indicating that the DC motor 11 is in the non-rotating state, the estimated motor rotation number MRQ is equal to zero. On the other hand, when the condition that VMS<VMQ2 is satisfied, indicating that the DC motor 11 is in the anti-forwarding state, the estimated motor rotation number MRQ can be determined in accordance with the following expression (3):

$$MRQ=(VMQ2-VMS) \times K2 \qquad (3)$$

where K2 represents a coefficient.

Finally, in a step S51, the estimated motor rotation number MRQ determined in accordance with the expression (2) or (3) is multiplied by a matching or correcting coefficient α in order to enhance the detection accuracy by compensating for variance in the estimated motor rotation number MRQ which is inherent to the drive mode of the DC motor 11 (second drive mode in this case) and the rotation number estimating method as adopted. Thus, the final motor rotation number MR (=MRQ×α) can be determined.

On the other hand, when it is decided by the CPU 20A in the step S47 that the FET 29 is turned on and off by the PWM control signal with the FET 32 being held constantly in the conducting state, indicating that the DC motor 11 is controlled in the first drive mode through the bridge commutation circuit BR (i.e., when the decision step S47 results in negation "NO"), the estimated motor voltage VMS is determined on the basis of the power supply voltage VB and the duty ratio DTY in a step S52. In that case, the estimated motor voltage VMS can be determined in accordance with the expression (1) mentioned hereinbefore in conjunction with the step S48.

Additionally, in a step S53, the upper limit value VMD1 and the lower limit value VMD2 used for deciding whether or not the DC motor 11 is in the non-rotating state are determined on the basis of the motor current IM (e.g. actually measured value ID thereof).

Subsequently, the estimated motor voltage VMS determined in the step S52 is compared with the reference values VMD1 and VMD2 determined in the step S53, whereupon the estimated motor rotation number MRD is determined on the basis of the result of the comparison (step S54).

More specifically, when the comparison mentioned above results in that VMS>VMD1 (indicating that the DC motor 11 is in the forwarding state), the estimated motor rotation number MRD in the first drive mode is determined in accordance with the following expression (4):

$$MRD=(VMS-VMD1) \times K3 \qquad (4)$$

where K3 represents a coefficient.

Further, when the condition that VMD1≧VMS≧VMD2 is satisfied, indicating that the DC motor 11 is in the non-rotating state, the estimated motor rotation number MRD is equal to zero. On the other hand, when the condition that VMS<VMD2 is satisfied, indicating that the DC motor 11 is in the anti-forwarding state, the estimated motor rotation number MRD can be determined in accordance with the following expression (5):

$$MRD=(VMD2-VMS) \times K3 \qquad (5)$$

where K3 represents a coefficient.

Finally, in a step S55, the estimated motor rotation number MRD determined in accordance with the expression (4) or (5) is multiplied by a matching or correcting coefficient β in order to enhance the detection accuracy by compensating for variance in the estimated motor rotation number MRD which is inherent to the drive mode of the DC motor 11 (the first drive mode in this case) and the rotation number estimating method as adopted. Thus, the final motor rotation number MR (=MRD×β) can be determined.

On the other hand, when the motor driving signal DM is not generated by the CPU 20A and when it is decided in the step S45 that the DC motor 11 is not driven (i.e., when the answer of this decision step S45 is negative "NO"), no motor current IM can be detected. Accordingly, the motor rotation number MR is estimated on the basis of the motor terminal voltage VMT of the DC motor 11, as described below.

At first, the CPU 20A fetches the motor terminal voltage VMT of the DC motor 11 as the voltage data via the motor terminal voltage detection circuit 25 in a step S56.

At this time point, the cathode of the diode 26 constituting a part of the bias circuit is connected via the resistor 27 to the terminal of the DC motor 11 to which the power supply source is connected, while the anode of the diode 26 is connected to the output terminal of the power supply circuit 21. The other terminal of the DC motor 11 is connected to the ground via the resistor 28.

By virtue of the arrangement described above, the motor terminal voltage VMT of the DC motor 11 as detected is added with the bias voltage VT. Thus, the motor rotation number MRV of the DC motor 11 can be estimated on the basis of the characteristic illustrated in FIG. 4. By way of example, when the value VT1 is detected as the motor terminal voltage VMT of the DC motor 11, the estimated rotation number MR of the DC motor 11 can be estimated to be "R1".

Finally, in a step S58, the estimated motor rotation number MRV is multiplied by a matching or correcting coefficient γ in order to enhance the detection accuracy by compensating for variance in the estimated motor rotation number MRV which is inherent to the drive mode of the DC motor 11 (non-rotating mode in this case) and the rotation number estimating method as adopted. Thus, the final motor rotation number MR can be determined.

The method of estimating the motor rotation number MR described above can advantageously be adopted in a four-wheel steering control system in which the rear wheels are also controlled by the DC motor 11.

Embodiment 2

Before entering into description of the second embodiment of the present invention, control operation of the DC motor 11 will briefly be explained.

In general, even when a motor voltage VM corresponding to the target motor current value IMO is applied to the DC motor 11, the rise-up of the motor current IM is accompanied with a time delay t due to the inductance components of the DC motor 11.

Figure 7:
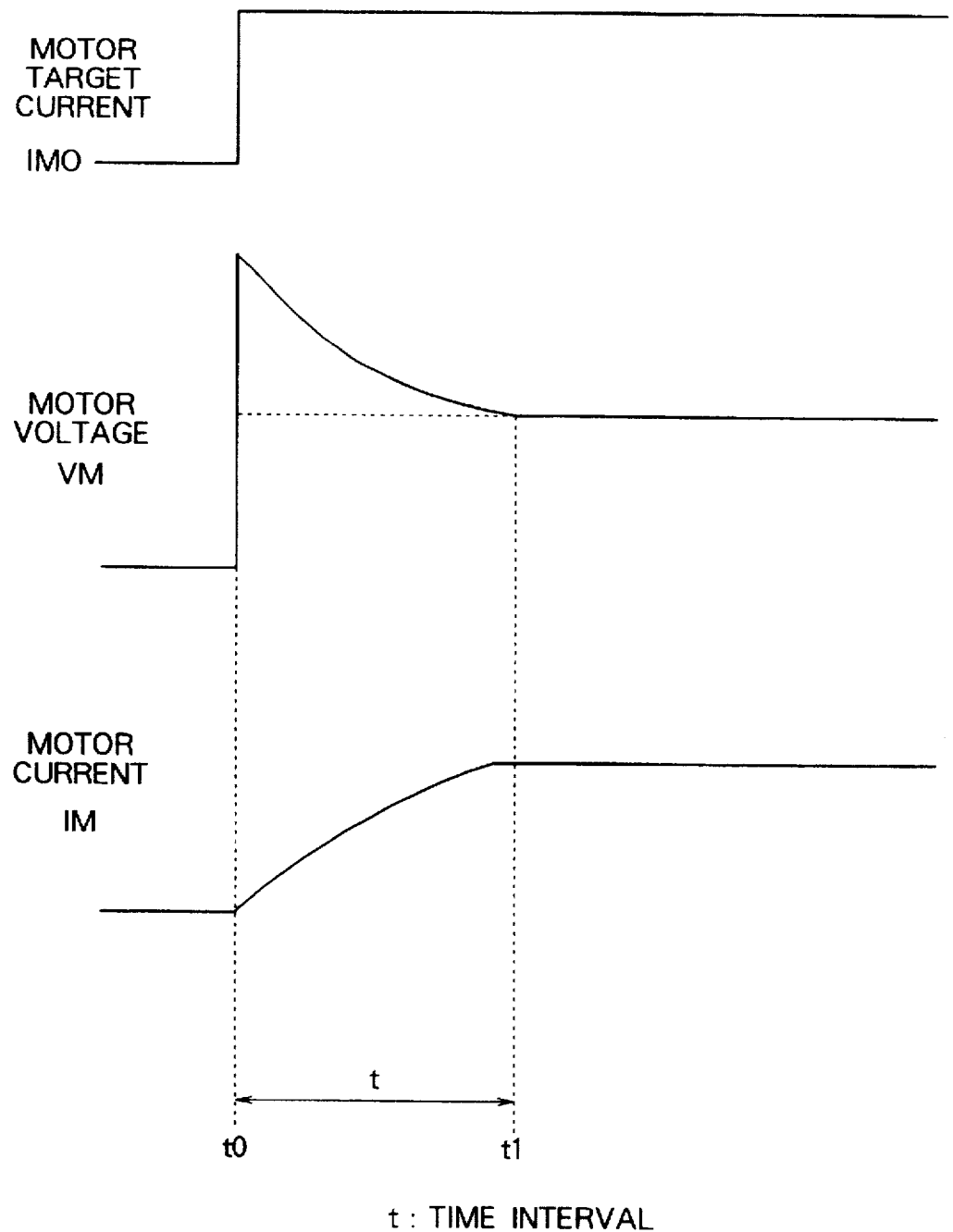
FIG. 7 is a waveform diagram for illustrating operation of a DC motor employed in the DC motor driven power steering system according to the first embodiment of the present invention.

Under the circumstances, there is generally adopted such a scheme according to which a high motor voltage VM is applied to the DC motor 11 at a time point to so that the motor current IM assumes the target motor current value IMO as quickly as possible, as is shown in FIG. 7. As the motor current IM approaches closely the target motor current value IMO, the motor voltage VM is progressively lowered so that it coincides with the target voltage value at a time point t1.

Accordingly, when estimation of the motor rotation number MR is made on the basis of the estimated motor voltage VMS and the motor current IM when the motor voltage VM are not yet stabilized, the estimated values MRQ or MRD of the motor rotation number MR as obtained in the step S50 or S54 will be accompanied with an error, giving rise to a problem.

For solving the problem mentioned above, the present invention incarnated in the second embodiment teaches that an interval setting means is provided for setting a temporal interval (e.g. a period of duration t) in succession to the change-over of the drive modes mentioned hereinbefore.

In that case, the interval setting means may be so arranged that when the target motor current IMO or the estimated motor voltage VMS changes significantly, the rotating state detecting means is inhibited from detecting the rotating state by neglecting the estimated motor rotation number MRQ or MRD during a period corresponding the interval t as set. Thus, the estimated motor rotation number MRQ or MRD can be protected against any noticeable error.

Embodiment 3

According to a third embodiment of the present invention, there is provided in addition to the interval setting means a delay means for adding a linear delay factor to the detection value of the rotating state of the DC motor 11 during a period corresponding to the aforementioned interval.

More specifically, a linear delay factor is added to the estimated motor voltage VMS such that the estimated motor voltage VMS approximates the response of the motor current IM. In this way, erroneous detection of the estimated motor voltage VMS can be prevented more positively.

Alternatively, the linear delay factor may be added to the estimated motor rotation number MRQ or MRD during the preset interval in succession to the change in the drive mode (or motor driving state) so that the influence of the erroneous detection to the arithmetic determination of the motor rotation number MR is mitigated.

Embodiment 4

In the case of the DC motor driven power steering control system according to the first embodiment of the invention, the rotation detecting means incorporated in the CPU 20A is changed over in dependence on the motor drive mode. However, the teachings of the invention can equally be applied to the system in which only the first drive mode or alternatively only the second drive mode is adopted.

By way of example, in the system in which only the first drive mode is effective, the error involved in the detection of the motor rotation number MR when the DC motor 11 is being driven in the forwarding direction can be suppressed to a minimum, as can be seen from the characteristic diagram of FIG. 2.

Similarly, in the system in which only the second drive mode is effective, error involved in the detection of the motor rotation number MR when the DC motor 11 is being rotated in the anti-forwarding direction can be reduced to a minimum, as will be seen from the characteristic diagram of FIG. 3.

Embodiment 5

In the system according to the first embodiment of the invention, the processing for detecting the motor rotation number MR in the non-driven state of the DC motor 11 (steps S56 to S58) is executed along with the processing for detecting the rotation in the driven state of the DC motor 11 (steps S48 to S55). However, such arrangement may equally be adopted in which only the rotation detecting processing in the non-driven state of the DC motor 11 is executed.

In that case, it is sufficient to provide only the bias circuit comprised of the voltage dividing resistors 27 and 28 and the motor terminal voltage detection circuit 25, whereby the aimed control can be realized without incurring expensiveness.

Embodiment 6

In the system according to the first embodiment of the invention, the error of the motor rotation number MR is lessened by multiplying the matching or correcting coefficient α, β or y in the step S51, S55 or S58. It should however be understood that in case the error is insignificant, these multiplication steps may be spared.

Embodiment 7

In each of the embodiments of the invention described above, the motor rotation number MR of the DC motor 11 is ultimately determined. However, the invention is not limited to such arrangement but may equally be applied to the case where simply it is decided whether the DC motor 11 is rotating or not. In this case, the abnormality such as locking of the DC motor 11 can be detected as well.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the bias circuit is provided as the pull-up bias circuit in association with the terminal of the DC motor 11 which is connected to the power supply, it may be provided as a pull-down bias circuit in association with the terminal connected to the ground potential. Similarly, the motor terminal voltage detection circuit 25 may equally be provided in association with the terminal of the DC motor 11 which is connected to the power supply.

Accordingly, all suitable modifications and equivalents may be resorted to, falling within the spirit and scope of the invention.

What is claimed is:

1. A DC motor driven power steering system for a motor vehicle, the system having means for detecting the rotation state of the DC motor, comprising:

a DC motor;

two sets of paired switching elements connected so as to constitute a bridge commutation circuit together with said DC motor for driving said DC motor;

motor drive control means for controlling operation of said DC motor by controlling said paired switching elements with a pulse-width modulated control signal;

motor current detecting means for detecting a motor current flowing through said DC motor;

power supply voltage detecting means for detecting a power supply voltage applied to said bridge commutation circuit;

motor voltage estimating means for estimating a voltage applied to said DC motor on the basis of said power supply voltage applied to said bridge commutation circuit and said pulse-width modulated control signals when said motor drive control means energizes said DC motor;

motor rotation detecting means for detecting rotation state of said DC motor on the basis of said motor current and said estimated motor voltage applied to said DC motor;

a motor terminal voltage detecting means connected to one of said motor terminals for detecting a motor terminal voltage at said one terminal; and motor drive state decision means for deciding whether or not said DC motor is being energized;

wherein said motor rotation detecting means detects rotation state of said DC motor on the basis of said motor terminal voltage when said DC motor is not being energized.

2. A DC motor driven power steering system for a motor vehicle according to claim 1, further comprising:

a motor terminal biasing circuit for applying a bias voltage to at least one terminal of said DC motor.

3. A DC motor drive power steering system for a motor vehicle, the system having means for detecting the rotation state of the DC motor, comprising:

a power supply circuit;

a voltage divider connected to said power supply circuit;

a DC motor having two terminals connected serially to said voltage divider;

two sets of paired switching elements connected so as to constitute a bridge commutation circuit together with said DC motor for driving said DC motor either in a forward direction or in a backward direction;

motor drive control means for controlling operation of said DC motor by controlling said paired switching elements with pulse-width modulated control signals;

motor current detecting means for detecting a motor current flowing through said DC motor;

power supply voltage detecting means for detecting a power supply voltage applied to said bridge commutation circuit;

motor voltage estimating means for estimating a voltage applied to said DC motor on the basis of said power supply voltage applied to said bridge commutation circuit and said pulse-width modulated control signals when said motor drive control means energizes said DC motor;

motor rotation detecting means for detecting rotation state of said DC motor on the basis of said motor current and said estimated motor voltage applied to said DC motor;

a motor terminal voltage detecting means connected to one of said two terminals for detecting a motor terminal voltage at said one terminal; and motor drive state decision means for deciding whether or not said DC motor is being energized;

wherein said motor rotation detecting means detects rotation state of said DC motor on the basis of said motor terminal voltage when said DC motor is not being energized.

4. A DC motor drive power steering system for a motor vehicle according to claim 3, wherein said voltage divider comprises:

a motor terminal biasing circuit for applying a bias voltage to at least one terminal of said DC motor.

5. A DC motor drive power steering system for a motor vehicle, the system having means for detecting the rotation state of the DC motor, comprising:

a DC motor;

two sets of paired switching elements connected so as to constitute a bridge commutation circuit together with said DC motor for driving said DC motor;

motor drive control means for controlling operation of said DC motor alternately in a first motor drive mode in which one of said paired switching elements is controlled with a pulse-width modulated control signal with the other switching element being held in the closed state and in a second motor drive mode in which both of said switching elements are controlled with pulse-width modulated control signals;

motor rotation detecting means for detecting rotating state of said DC motor in dependence on said motor drive modes;

switching means for changing said motor rotation detecting means in dependence on said motor drive modes; and multiplying means for multiplying the detected value outputted from said motor rotation detecting means with a scaling factor corresponding to the motor drive mode of the DC motor.

6. A DC motor driven power steering system for a motor vehicle according to claim 5, further comprising:

interval setting means for setting an interval following a change of said motor drive mode;

wherein said motor rotation detecting means is inhibited from detecting the rotation state of said DC motor during a period corresponding to said interval.

7. A DC motor driven power steering system for a motor vehicle according to claim 5, further comprising:

interval setting means for setting an interval following a change of said motor drive mode; and means for correcting the detected value outputted from said motor rotation detecting means during said period with a linear delay factor.

8. A DC motor driven power steering system for a motor vehicle according to claim 5, further comprising:
- a motor terminal biasing circuit for applying a bias voltage to at least one terminal of said DC motor;
- a motor terminal voltage detecting means connected to one of said motor terminals for detecting a motor terminal voltage at said one terminal; and
- motor drive state decision means for deciding whether or not said DC motor is being energized;

wherein said motor rotation detecting means detects rotation state of said DC motor on the basis of said motor terminal voltage when said DC motor is not being energized.

* * * * *